US009536513B2

(12) United States Patent
Wulff et al.

(10) Patent No.: US 9,536,513 B2
(45) Date of Patent: Jan. 3, 2017

(54) POLYMER DISPERSIONS AND SOUND DEADENER COMPOSITIONS WITH EMULSION POLYMER FROM TWO-STAGE PREPARATION

(71) Applicant: BASF SE, Ludwigshafen (DE)

(72) Inventors: Dirk Wulff, Schifferstadt (DE); Joerg-Alexander Dimmer, Mannheim (DE); Peter Preishuber-Pfluegl, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/910,607

(22) PCT Filed: Jul. 25, 2014

(86) PCT No.: PCT/EP2014/066054
§ 371 (c)(1),
(2) Date: Feb. 5, 2016

(87) PCT Pub. No.: WO2015/018665
PCT Pub. Date: Feb. 12, 2015

(65) Prior Publication Data
US 2016/0196815 A1 Jul. 7, 2016

(30) Foreign Application Priority Data
Aug. 6, 2013 (EP) ..................... 13179452

(51) Int. Cl.
*G10K 11/162* (2006.01)
*C09D 133/08* (2006.01)
*C08K 3/30* (2006.01)
*C08F 2/00* (2006.01)
*C08F 2/24* (2006.01)

(52) U.S. Cl.
CPC ............ *G10K 11/162* (2013.01); *C08F 2/001* (2013.01); *C08F 2/24* (2013.01); *C08K 3/30* (2013.01); *C09D 133/08* (2013.01); *C08K 2003/3045* (2013.01)

(58) Field of Classification Search
CPC ........ G10K 11/162; C08K 3/30; C09D 133/08
See application file for complete search history.

(56) References Cited

U.S. PATENT DOCUMENTS

| 6,502,821 | B2 | 1/2003 | Schneider |
| 2004/0033354 | A1 | 2/2004 | Fisher et al. |
| 2007/0048445 | A1* | 3/2007 | DiMario .............. C09D 5/4411 427/180 |
| 2009/0048357 | A1 | 2/2009 | Yasui et al. |

FOREIGN PATENT DOCUMENTS

| EP | 0 081 083 A2 | 6/1983 | |
| EP | 1 520 865 A2 | 4/2005 | |
| EP | 2 420 412 A1 | 2/2012 | |
| WO | WO 2007/034933 A1 * | 3/2007 | .............. C08L 51/06 |
| WO | WO 2012/010632 A1 | 1/2012 | |

OTHER PUBLICATIONS

International Search Report issued Oct. 22, 2014 in PCT/EP2014/066054.
International Preliminary Report on Patentability and Written Opinion issued Feb. 9, 2016 in PCT/EP2014/066054 (with English language translation).

* cited by examiner

*Primary Examiner* — Robert Harlan
(74) *Attorney, Agent, or Firm* — Oblon, McClelland, Maier & Neustadt, L.L.P.

(57) ABSTRACT

A description is given of an aqueous polymer dispersion comprising a polymer which is obtainable by emulsion polymerization from a monomer mixture comprising as hydrophilic monomers ethoxylated (meth)acrylate monomer, acid monomer, and C1 to C20 hydroxyalkyl(meth)acrylate; and also at least one hydrophobic principal monomer, selected from C1 to C20 alkyl(meth)acrylates and vinylaromatics; and also, optionally, further monomers. This polymer is preparable by at least two-stage emulsion polymerization, where in a first polymerization stage the predominant fraction or the entire amount of the hydrophilic monomers is used, and in a later polymerization stage the predominant fraction or the entire amount of the hydrophobic monomers is used. The polymer dispersion is a suitable binder for aqueous particle dispersions, more particularly of sound deadener compositions, which comprise inorganic and optionally also organic particulate solids. Also described is a method for damping oscillations or vibrations of vehicle components.

14 Claims, No Drawings

POLYMER DISPERSIONS AND SOUND DEADENER COMPOSITIONS WITH EMULSION POLYMER FROM TWO-STAGE PREPARATION

The invention relates to an aqueous polymer dispersion comprising a polymer which is obtainable by emulsion polymerization from a defined monomer mixture, comprising certain hydrophilic and hydrophobic monomers. This polymer is preparable by at least two-stage emulsion polymerization, where in a first polymerization stage the predominant fraction or the entire amount of the hydrophilic monomers is used, and in a later polymerization stage the predominant fraction or the entire amount of the hydrophobic monomers is used. The polymer dispersion is suitable as a binder for aqueous particle dispersions, more particularly of sound deadener compositions, which comprise inorganic and optionally also organic particulate solids. The invention also relates to a method for damping oscillations or vibrations of vehicle components.

Oscillations or vibrations of machinery or vehicle components generate unwanted noise. For noise reduction, the components can be treated with what are called sound deadener compositions, also referred to as LASD (liquid applied sound damping) compositions. Vibration-damping materials are described in, for example, Journal of Materials Science 36 (2001) 5733-5737, US 2004/0033354, and U.S. Pat. No. 6,502,821. Geometrically complex, three-dimensional components can be treated by spray application of a sound deadener composition in the form of an aqueous dispersion. Dispersions of this kind generally comprise a dispersed, viscoelastic polymer and inorganic fillers. Vibration-damping compositions based on water-based polymer dispersions and inorganic fillers along with further auxiliaries are known from EP 1520865, WO 2007/034933, EP 2420412, and WO 2012/010632. The quality of a sound deadener composition can be measured by measuring the flexural vibrations by the resonance curve method in accordance with ISO 6721-1 and ISO 6721-3. One measure of the vibration-damping effect is the loss factor tan delta. When sound deadener compositions based on viscoelastic polymers are used, the loss factor is temperature-dependent. The desire is for materials which result in a maximum loss factor in the temperature range in which the machinery or vehicles are typically operated, of between 0 and 40° C., for example. In the case of sound deadener compositions based on aqueous systems, particular challenges are posed by the drying behavior and by the absorption of water by the dried compositions on contact with moisture. Drying may be accompanied by unwanted blistering, the formation of larger or smaller pores, or unwanted expansion.

It was an object of the present invention to provide further materials having good or improved vibration-damping properties and, in particular, good drying behavior and minimal water absorption on the part of the dried compositions.

It has been found that when certain polymer dispersions are used as binders, it is possible to provide sound deadener compositions having good vibration-damping properties, low water absorption, and good drying behavior.

The invention accordingly provides an aqueous polymer dispersion comprising at least one polymer which is obtainable by emulsion polymerization from a monomer mixture comprising hydrophilic monomers (a) to (c) which have hydrophilic groups, and more specifically (a) at least one (meth)acrylate monomer with polyethylene glycol group,
(b) at least one acid monomer,
(c) at least one hydroxyalkyl(meth)acrylate having 1 to 20 C atoms in the alkyl group, and also at least one hydrophobic principal monomer (d), selected from
(d) alkyl(meth)acrylates having 1 to 20 C atoms in the alkyl group, vinylaromatics, and mixtures of these monomers, and also, optionally,
(e) further monomers, different from the monomers (a) to (d), which are ethylenically unsaturated and radically polymerizable;

where the polymer is preparable by at least two-stage emulsion polymerization, where in a first polymerization stage the predominant fraction or the entire amount of the hydrophilic monomers (a) to (c) is used, and in a later polymerization stage the predominant fraction or the entire amount of the hydrophobic monomers (d) is used.

The invention also provides the use of the polymer dispersion as a binder for preparing an aqueous particle dispersion, the aqueous particle dispersion comprising dispersed inorganic particulate solids that are insoluble in water, and also, optionally, further, organic particulate solids as well, more particularly inorganic or organic fillers.

The invention also provides an aqueous particle dispersion, more particularly a particle dispersion suitable for producing sound deadener compositions, and also the sound deadener compositions themselves, in each case comprising
(i) the polymer dispersion; and
(ii) inorganic fillers
and optionally organic fillers, and also further auxiliaries.

The invention also provides the use of the sound deadener composition for vibration damping of bodywork parts of a vehicle, and also a method for damping oscillations or vibrations of vehicle components, where
(1) a sound deadener composition of the invention is provided, and
(2) the sound deadener composition is applied to a vehicle component and dried.

Principal monomers are monomers which account in total for more than 50 wt %, based on the sum total of all the monomers, of a polymer.

The designation "(meth)acryl . . . " and similar designations are used as an abbreviated notation for "acryl . . . or methacryl . . . ".

Hydrophilic monomers are monomers which have at least one hydrophilic group, more particularly at least one hydroxyl group, acid group, or polyethylene glycol group with at least two ethylene glycol units. Hydrophobic monomers are monomers which have no hydrophilic group, more particularly hydrocarbon monomers or alkyl(meth)acrylate esters.

The (meth)acrylate monomers with polyethylene glycol group (a) are used preferably in an amount of at least 0.1 wt %, preferably 0.2 to 5 wt %, or from 0.2 to 3 wt %, based on the entire amount of all the monomers. Polyethylene glycol groups are polyalkylene glycol groups in which at least 50 wt %, preferably at least 60 wt %, at least 75 wt %, or 100 wt % of the alkylene glycol units are ethylene glycol units. The remaining alkylene glycol units may have, for example, 3 to 4 C atoms. The polyalkylene glycol chain may have an OH end group or, preferably, an alkyl ether end group with for example 1 to 4 C atoms, more particularly a methoxy group. Suitable (meth)acrylate monomers with polyethylene glycol group (a) are, for example, alkoxy-poly(ethylene glycol)(meth)acrylates. The alkoxy group may have for example 1 to 4 C atoms. A methoxy group is preferred. The poly(ethylene glycol) group preferably has a weight-average molecular weight of 500 to 5000, more particularly from 1000 to 3000. A suitable example is methyl-poly(ethylene glycol) methacrylate, with the poly(ethylene glycol) group having a weight-average molecular weight of 500 to 5000, more particularly of 1000 to 3000, e.g., MPEG 2000 MA (Bisomer® S20W).

The polymer is prepared from at least one acid monomer (b). Monomer type (b) may be present at least at 0.05 wt %, preferably 0.1 to 5 wt %, more preferably 0.2 to 4 wt %, based on the entire amount of the monomers used in preparing the polymer. Acid monomers are ethylenically unsaturated, radically polymerizable monomers which have at least one acid group. Acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate, and sulfopropyl methacrylate. Acrylic acid and methacrylic acid and the mixture thereof are preferred; acrylic acid is particularly preferred.

The hydroxyalkyl(meth)acrylate monomers (c) are used preferably in an amount of at least 0.05 wt %, preferably 0.1 to 5 wt %, or from 0.2 to 3 wt %, based on the entire amount of the monomers used in preparing the polymer. The hydroxyalkyl(meth)acrylates have 1 to 20, preferably 2 to 10, C atoms in the alkyl group. Suitable monomers (c) are for example selected from hydroxyethyl(meth)acrylate, hydroxypropyl(meth)acrylate, hydroxybutyl(meth)acrylate, and the mixture thereof. Preferred are hydroxyethyl(meth)acrylate and hydroxypropyl(meth)acrylate, more particularly hydroxyethyl methacrylate.

The hydrophobic principal monomers are used preferably in an amount of in total at least 50 wt % or more, preferably 60 to 99 wt % or 80 to 99 wt %, based on the entire amount of the monomers used in preparing the polymer. The principal monomers (d) are selected from alkyl(meth)acrylates having 1 to 20 C atoms, preferably having 1 to 10 C atoms in the alkyl group, vinylaromatics, and mixtures of these monomers. Alkyl(meth)acrylates are, for example, methyl methacrylate, methyl acrylate, n-butyl acrylate, ethyl acrylate, n-hexyl acrylate, octyl acrylate, 2-ethylhexyl acrylate, and 2-propylheptyl acrylate. In particular, mixtures of the (meth)acrylic acid alkyl esters are also suitable. Vinylaromatics contemplated include vinyltoluene, alpha- and para-methylstyrene, alpha-butylstyrene, 4-n-butylstyrene, 4-n-decylstyrene, and—preferably—styrene.

The polymer may optionally be prepared from further monomers (e), different from the monomers (a) to (d), which are ethylenically unsaturated and radically polymerizable. The amount of further monomers (e) is preferably 0 to 10 wt %, or 0.1 to 5 wt %, based on the entire amount of monomers. The further monomers (e) may be selected from vinyl esters of carboxylic acids comprising up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Vinyl esters of carboxylic acids having 1 to 20 C atoms are, for example, vinyl laurate, vinyl stearate, vinyl propionate, Versatic acid vinyl esters, and vinyl acetate. Examples of nitriles are acrylonitrile and methacrylonitrile. The vinyl halides are ethylenically unsaturated compounds substituted by chlorine, fluorine, or bromine, preferably vinyl chloride and vinylidene chloride. Examples of vinyl ethers include vinyl methyl ether and vinyl isobutyl ether. Preference is given to vinyl ethers of alcohols comprising 1 to 4 C atoms. Hydrocarbons having 2 to 8 C atoms and one or two olefinic double bonds include ethylene, propylene, isoprene, and chloroprene.

One embodiment of the invention concerns a polymer dispersion wherein the polymer is obtainable by emulsion polymerization from a monomer mixture comprising (a) at least one monomer selected from alkoxy-poly(ethylene glycol)(meth)acrylates, the alkoxy group preferably being a methoxy group, and the poly(ethylene glycol) group preferably having a weight-average molecular weight of 500 to 5000;

(b) at least one acid monomer (b) selected from acrylic acid and methacrylic acid;

(c) at least one monomer selected from hydroxyethyl(meth)acrylate, hydroxypropyl(meth)acrylate, and hydroxybutyl(meth)acrylate;

(d) at least one hydrophobic monomer selected from alkyl(meth)acrylates having from 1 to 10 C atoms in the alkyl group and styrene;

(e) optionally further monomers, different from the monomers (a) to (d), which are ethylenically unsaturated and radically polymerizable, selected from vinyl esters of carboxylic acids comprising up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

The glass transition temperature of the polymer prepared by emulsion polymerization is preferably in the range from −60° C. to less than or equal to +70° C. or in the range from −30° C. to less than or equal to +60° C., more preferably in the range from −15 to +50° C. The glass transition temperature can be determined by means of differential scanning calorimetry (ASTM D 3418-08, midpoint temperature). For the skilled person, the possibility of setting the desired glass transition temperature through selection of monomer type and monomer amount is general knowledge.

The polymer dispersions of the invention are dispersions of polymers in an aqueous medium. The aqueous medium may, for example, be exclusively water, or may alternatively be mixtures of water with a water-miscible solvent such as methanol, ethanol, or tetrahydrofuran. It is preferred not to use organic solvents. The solids contents of the dispersions are preferably from 15 to 75 wt %, more preferably from 40 to 60 wt %, more particularly greater than 50 wt %. The solids content may be realized for example through corresponding adjustment to the monomer amounts and/or to the amount of water used in the emulsion polymerization. The average size of the polymer particles dispersed in the aqueous dispersion is preferably less than 400 nm, more particularly less than 300 nm. With particular preference the average particle size is between 140 and 250 nm. By average particle size here is meant the $d_{50}$ of the particle size distribution—that is, 50 wt % of the entire mass of all the particles have a diameter smaller than the $d_{50}$. The particle size distribution can be determined in a known way using an analytical ultracentrifuge (W. Mächtle, Makromolekulare Chemie 185 (1984), pages 1025-1039). The pH of the polymer dispersion is set preferably to more than 4, more particularly to a pH of between 5 and 9.

The polymer dispersions of the invention are preferably low in emulsifier, meaning that they comprise emulsifiers (nonpolymeric, amphiphilic, surface-active substances added to the polymerization mixture) in an amount of preferably less than 3 wt % or less than 1 wt %. In one embodiment of the invention, therefore, the emulsion polymerization, carried out in at least two stages, takes place with little emulsifier or in emulsifier-free form, i.e., without addition of emulsifiers. The polymer formed in the first stage may take on the function of an emulsifier or of a protective colloid for the subsequent stages.

The invention also provides a process for preparing a polymer dispersion, where at least two-stage emulsion polymerization is used to prepare a polymer from a monomer mixture, comprising hydrophilic monomers (a) to (c) which have hydrophilic groups, and more specifically (a) at least one (meth)acrylate monomer with polyethylene glycol group,
(b) at least one acid monomer,
(c) at least one hydroxyalkyl(meth)acrylate having 1 to 20 C atoms in the alkyl group, and also at least one hydrophobic principal monomer (d), selected from
(d) alkyl(meth)acrylates having 1 to 20 C atoms in the alkyl group, vinylaromatics, and mixtures of these monomers, and also, optionally,
(e) further monomers, different from the monomers (a) to (d), which are ethylenically unsaturated and radically polymerizable;

where in a first polymerization stage the predominant fraction or the entire amount of the hydrophilic monomers (a) to (c) is used, and in a later polymerization stage the predominant fraction or the entire amount of the hydrophobic monomers (d) is used.

The polymers can be prepared by at least two-stage emulsion polymerization, the product then being an emulsion polymer. In the course of the emulsion polymerization it is usual to use ionic and/or nonionic emulsifiers and/or protective colloids, or stabilizers, as interface-active compounds in order to assist the dispersing of the monomers in the aqueous medium. The polymer which forms in the first stage may act as an emulsifier or protective colloid, and it may therefore be advantageous to operate with reduced amounts, or absence, of additional protective colloids or emulsifiers.

If emulsifiers are used as additional interface-active substances, they are preferably anionic or nonionic emulsifiers. Suitable emulsifiers are, for example, ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. Further suitable emulsifiers are compounds of the general formula

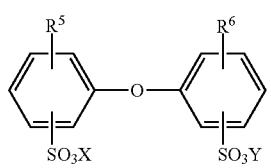

in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 C atoms, or hydrogen, and more particularly having 6, 12, and 16 C atoms, with $R^5$ and $R^6$ not being both simultaneously hydrogen. X and Y are preferably sodium, potassium, or ammonium ions, with sodium being particularly preferred. Particularly advantageous are compounds II in which X and Y are sodium, $R^5$ is a branched alkyl radical having 12 C atoms, and $R^6$ is hydrogen or $R^5$. Use is frequently made of technical mixtures which include a fraction of 50 to 90 wt % of the monoalkylated product, an example being Dowfax®2A1 (trademark of the Dow Chemical Company). Suitable emulsifiers are also found in Houben-Weyl, Methoden der organischen Chemie, Volume 14/1, Makromolekulare Stoffe [Macromolecular compounds], Georg Thieme Verlag, Stuttgart, 1961, pages 192 to 208. Emulsifier trade names are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Also suitable are copolymerizable emulsifiers which comprise a radically polymerizable, ethylenically unsaturated double bond, examples being reactive anionic emulsifiers such as Adeka® Resoap SR-10.

The emulsion polymerization takes place in general at 30 to 130, preferably 50 to 95° C. The polymerization medium may consist either only of water, or of mixtures of water and water-miscible liquids such as methanol. It is preferred to use just water.

The polymerization takes place in at least two stages, where in a first polymerization stage the predominant fraction or the entire amount of the hydrophilic monomers (a) to (c) is used, and in a later polymerization stage the predominant fraction or the entire amount of the hydrophobic monomers (d) is used. The further monomers (e) may be used in any desired polymerization stage. Preference is given to a feed process, in which the monomers of the first stage and initiator are introduced as an initial charge, heated to the polymerization temperature, and subjected to initial polymerization, for a period of 5 minutes to 1 hour, for example. The monomers of the second and of optionally further stages may then be supplied to the polymerization zone, continuously, in stages, or under a concentration gradient, via one or more spatially separate feeds, with the polymerization being maintained. In the polymerization it is also possible to include a polymer seed in the initial charge, in order, for example, to set the particle size more effectively.

Preferably, in the first polymerization stage more than 50 wt %, at least 60 wt %, or at least 80 wt % or 100 wt %, of the entire amount of the hydrophilic monomers (a) to (c) and at least 1 wt %, preferably 2 to 20 or 2 to 10 wt %, of the entire amount of the hydrophobic monomers (d) are used, and in a second and/or later polymerization stage at least 80 wt %, preferably 90 to 98 wt %, of the entire amount of the hydrophobic monomers (d) is used.

For the emulsion polymerization it is possible to use the typical and known auxiliaries, such as water-soluble initiators and chain transfer agents, for example. Water-soluble initiators for the emulsion polymerization are, for example, ammonium salts and alkali metal salts of peroxydisulfuric acid, e.g., sodium peroxodisulfate, hydrogen peroxide, or organic peroxides, e.g., tert-butyl hydroperoxide. Also suitable are what are called reduction-oxidation (redox) initiator systems. The redox initiator systems are composed of at least one usually inorganic reducing agent and one organic or inorganic oxidizing agent. The oxidizing component comprises, for example, the initiators already specified above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and the salts thereof, or ascorbic acid. The redox initiator systems can be used together with soluble metal compounds whose metallic component is able to occur in a plurality of valence states. Examples of typical redox initiator systems include ascorbic acid/iron(II) sulfate/sodium peroxydisulfate, tert-butyl hydroperoxide/sodium disulfite, tert-butyl hydroperoxide/Na-hydroxymethanesulfinic acid, or tert-butyl hydroperoxide/ascorbic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water that is acceptable in the dispersion, and the upper concentration by the solubility of the respective compound in water. In general the concentration is 0.1 to 30 wt %, preferably 0.5 to 20 wt %, more preferably 1.0 to 10 wt %, based on the solution. The amount of the initiators is generally 0.1 to 10 wt %, preferably 0.5 to 5 wt %, based on the monomers to be polymerized. It is also possible for two or more different initiators to be used for the emulsion polymerization. For the purpose of removing the residual monomers, it is typical for initiator to be added after the end of the actual emulsion polymerization as well.

In the polymerization it is possible to use chain transfer agents to regulate molecular weight, in amounts, for example, of 0 to 0.8 part by weight, based on 100 parts by weight of the monomers to be polymerized, thereby reducing the molar mass. Suitability is possessed, for example, by compounds having a thiol group such as tert-butyl mercaptan, thioglycolic esters, such as 2-ethylhexyl thioglycolate, mercaptoethanol, mercaptopropyltrimethoxysilane, n-dodecyl mercaptan, or tert-dodecyl mercaptan. It is additionally possible to use chain transfer agents without a thiol group, such as C6 to C20 hydrocarbons, for example, which form a pentadienyl radical when hydrogen is abstracted, an example being terpinolene. In one preferred embodiment the emulsion polymer is prepared using 0.05 to 0.5 wt %, based on the monomer amount, of at least one chain transfer agent to regulate molecular weight.

In the emulsion polymerization, aqueous dispersions of the polymer are obtained with solids contents in general of 15 to 75 wt %, preferably of 40 to 75 wt %. For a high space/time yield of the reactor, dispersions with as high a solids content as possible are preferred. In order to be able to achieve solids contents >60 wt %, a bimodal or polymodal particle size ought to be set, since otherwise the viscosity becomes too high and the dispersion is no longer manageable. Producing a new particle generation can be accomplished, for example, by addition of seed (EP 81083), by addition of excess quantities of emulsifier, or by addition of miniemulsions. A further advantage associated with the low viscosity at high solids content is the improved coating behavior at high solids contents. Producing one or more new particle generations can be done at any desired point in time. This point in time is guided by the particle size distribution that is desired for a low viscosity.

The invention also provides the use of a polymer dispersion of the invention as a binder for preparing an aqueous particle dispersion, the aqueous particle dispersion comprising dispersed inorganic particulate solids that are insoluble in water, and also, optionally, further, organic particulate solids as well, more particularly inorganic or organic fillers. The dispersed particulate solids may be selected, for example, from inorganic fillers, more particularly from kaolin, chalk, barium sulfate, carbon black, graphite, talc, clay minerals, microdolomite, finely ground quartz, and mica, and also, optionally, further, from organic fillers, more particularly powder coating materials, polymer powders of, for example, ground solid EVA resins, dried acrylate dispersions, and polysaccharides. The aqueous particle dispersion may for example be a sound deadener composition or a composition for underbody protection on a motor vehicle.

The invention also provides an aqueous particle dispersion, suitable for purposes including the preparation of a sound deadener composition, comprising
(i) a polymer dispersion described above; and
(ii) inorganic and also, optionally, further, organic fillers as well.

The sound deadener composition preferably comprises
(a) 5 to 50 wt %, preferably 10 to 40 wt % (based on solids), of the polymer dispersion described above,
(b) 40 to 80 wt %, preferably 60 to 70 wt %, of inorganic fillers,
(c) 0 to 40 wt %, preferably 5 to 20 wt %, of organic fillers,
(d) 10 to 40 wt %, preferably 20 to 30 wt %, of water, and
(e) 0 to 10 or 0 to 5 wt %, preferably 0.1 to 3 wt %, of auxiliaries.

Suitable inorganic fillers are, for example, calcium carbonate, kaolin, mica, silica, chalk, microdolomite, finely ground quartz, mica, talc, clay, barium sulfate, argillaceous earth, iron oxide, titanium dioxide, glass powder, glass flakes, magnesium carbonate, aluminum hydroxide, bentonite, flyash, kieselguhr, perlite, carbon black, graphite, clay minerals, microdolomite, finely ground quartz and mica. Preference is given to using fillers in flake form such as mica, for example, alone or in combination with customary inorganic pigments such as calcium carbonate, barium sulfate, kaolin, silica, chalk, or talc.

Suitable organic fillers are, for example, powder coating materials, examples being epoxy powder coating materials, polymer powders of, for example, ground solid ethylene/vinyl acetate copolymer (EVA) resins, dried acrylate dispersions, and polysaccharides.

Preference is given to using 50 to 700 or 100 to 550 parts by weight of inorganic filler per 100 parts by weight of polymer dispersion, with preference being given to using 30 to 150 or 40 to 120 parts by weight of fillers in flake form per 100 parts by weight of polymer dispersion.

Auxiliaries, which are used preferably at not less than 0.1 wt %, as for example from 0.1 to 10 wt % or from 0.2 to 5 wt % or from 0.2 to 3 wt %, are, for example, thickeners, resins, plasticizers, dispersants, cosolvents, stabilizers, wetting agents, preservatives, foam inhibitors, glass beads or plastics beads, hollow glass or plastics bodies, antifreeze agents, antioxidants, UV absorbers, epoxy powder coating materials, emulsifiers, siloxanes, organically modified siloxanes, and antistats. Of the auxiliaries it is possible to use one, two or more in combination. Suitable cosolvents are, for example, ethylene glycol, diethylene glycol, ethylene glycol alkyl ethers (e.g., Cellosolve® products), diethylene glycol alkyl ethers (e.g., Carbitol® products), carbitol acetate, butylcarbitol acetate, or mixtures thereof. Thickeners are, for example, polyvinyl alcohols, cellulose derivatives, polyacrylic acids, or acrylic acid/acrylate ester copolymers in amounts of, for example, 0.01 to 4 or of 0.05 to 1.5 or of 0.1 to 1 part by weight, based on 100 parts by weight of solid. Dispersants are, for example, sodium hexametaphosphate, sodium tripolyphosphates, or polycarboxylic acids. Antifreeze agents are, for example, ethylene glycol or propylene glycol. Foam inhibitors are, for example, silicones. Stabilizers are, for example, polyvalent metal compounds such as zinc oxide, zinc chloride, or zinc sulfate.

The maximum of the loss factor tan delta for sound deadener compositions of the invention is preferably in the range from −30 to +60° C. Where core-shell particles or other particles having a multiphase particle structure are used, the different polymer phases having different glass transition temperatures, there are in general at least two maxima for the loss factor at not less than two different temperatures. In this case preferably all of the maxima of the loss factor are situated in the range from −30 to +60° C.

The invention also provides the use of a sound deadener composition of the invention for vibration damping of bodywork parts of a vehicle, and also a method for damping oscillations or vibrations of vehicle components, where (1) a sound deadener composition described in more detail above, comprising a polymer dispersion of the invention, is provided, and
(2) the sound deadener composition is applied to a vehicle component and dried.

Application may take place in a usual way, as for example by spreading, rolling, or spraying. The amount applied is preferably from 1 to 7 kg/m² or from 2 to 6 kg/m² after drying. Drying may take place at ambient temperature or preferably by application of heat. The drying temperatures are preferably from 80 to 210° C. or from 90 to 180° C. or from 120 to 170° C.

The sound deadener composition may be employed, for example, in vehicles of all kinds, more particularly road motor vehicles, automobiles, rail vehicles, and also in boats, aircraft, electrical machinery, construction machinery, and buildings.

The polymer dispersions used in sound deadener compositions in accordance with the invention have good performance properties in terms of high ease of application, good vibration-damping properties, good drying behavior, and low water absorption on the part of the dried compositions.

EXAMPLES

Materials Used:
Bisomer® S20W MPEG 2000 MA, 50% in water; methylpoly(ethylene glycol)methacrylate, having a weight-average molecular weight of the poly(ethylene glycol) group of 2000
Disponil® SDS sodium dodecyl sulfate, 15% in water Example 1

Dispersion D1

In a 2 liter polymerization reactor with anchor stirrer and heating/cooling facility, a mixture of 233.3 g of deionized water, 4.0 g of acrylic acid, 3.8 g of 25% strength aqueous ammonia solution, 2.8 g of styrene, 2.3 g of 2-hydroxyethyl methacrylate, and 6.6 g of Bisomer® S20W is heated to 90° C. under a nitrogen atmosphere. Then at the stated temperature a portion of 56.8 g of feed 1 and a portion of 13.7 g of feed 2 are added [1st stage].

Feed 1 is an emulsion prepared from
284.6 g deionized water
21.3 g Disponil® SDS
4.0 g 2-ethyihexyl thioglycolate
469.0 g n-butyl acrylate
340.0 g methyl methacrylate
Feed 2 is 68.6 g of a 7 wt % strength aqueous solution of sodium peroxodisulfate.

After 10 minutes, the remainder of feed 1 and feed 2 is metered in at a uniform rate over 4.0 hours [2nd stage]. After the end of feed 1, polymerization is continued for 30 minutes. Thereafter 38.5 g of water are added and the pH is adjusted with a 25% strength sodium hydroxide solution over 30 minutes.
Viscosity DIN EN ISO 3219: 400-1500 mPas
Solids content: 55%
pH: 6.7

Example 2

Dispersion D2 (Comparative)

Acronal® DS 3502: Acrylic ester copolymer, 55% dispersion in water
Sound Deadener Composition A1:
The aqueous dispersion D1 is mixed at room temperature in a ratio of 25:75 (solid:solid) with the fillers barium sulfate, chalk (Omyacarb® 20BG) and epoxy powder coating (EP corrosion primer jet black GL) in a ratio of 46.5:46.5:7 (solid:solid) and also 4% of diethylene glycol, 0.6% of Viskalex® HV30 (thickener), 0.4% of Lumiten I-SC (emulsifier), 1% of Hexamoll DINCH (plasticizer), and 0.2% of EFKA 3580 (organically modified siloxane), by means of a dissolver-stirrer, and the mixture is subsequently homogenized in a Speedmixer.
Sound Deadener Composition A2:
As sound deadener composition A1, using dispersion D2 instead of Dl.
Sound Deadener Composition A3:
As sound deadener composition A2, using additionally 1.4% of DISPEX® Ultra PA 4580 (EFKA 4580; polymeric pigment dispersant).
Sound Deadener Composition A4:
As sound deadener composition A2, using additionally 1.1% of DISPEX® Ultra PA 4530 (EFKA 4530, modified polyacrylate; pigment dispersant).
Sound Deadener Composition A5:
As sound deadener composition A2, using additionally 1.9% of Dispex® AA 4030 (Pigmentverteiler A; pigment dispersant based on polyacrylic acid)
Sound Deadener Composition A6:
As sound deadener composition A2, using additionally 1.6% of Dispex® AA 4135 (Pigmentverteiler NL; pigment dispersant)
Sound Deadener Composition A7:
As sound deadener composition A2, using additionally 2.2% of Dispex® CX 4320 4135 (Pigmentverteiler MD 20; pigment dispersant)
Sound Deadener Composition A8:
As sound deadener composition A2, using additionally 1.9% of Dispex® CX 4231 (Ultradispers AB30; pigment dispersant)
Description of Mixing Assemblies:
Speedmixer:
A DAC 400FVZ SpeedMixer from Hausschild is employed.

Dissolver-Stirrer:

The apparatus consists of a stirrer mechanism, a shaft driven by said mechanism, and a dissolver disk as stirring tool.

Performance Tests

Determination of the Loss Factor:

To assess the vibration-damping behavior, the loss factor tan delta at 25° C. is measured as described in WO 2007/034933 (in analogy to ISO 6721-1 and ISO 6721-3). For this purpose, a steel sheet test specimen with a size of 30×300× 1.6 mm is coated with the sound deadener composition under test, and dried at 160° C. for 30 minutes.

The coating quantity is approximately 3.0 kg per $m^2$.

Determination of Water Absorption:

The water absorption is determined in accordance with DIN EN ISO 62:2008. For this purpose, films of the prepared sound deadener compositions, with a thickness of about 2 mm and a side length of 25 mm in each case, are produced. The films are dried at 160° C. for 30 minutes and stored in demineralized water for 24 hours. A determination is made of the relative mass increase on storage, in percent.

Drying Behavior:

i: Blistering:

The sound deadener composition with a thickness of 3 mm and an edge length of 60 mm×100 mm is inspected after 30 minutes of drying at 160° C. In this inspection, the following scale of ratings is used:
1: no blisters
2: 2-3 small blisters
3: slight lifting of the composition
4: large blister, complete composition swells up ii: Porosity:

The sound deadener composition with a thickness of 3 mm and an edge length of 60 mm×100 mm is inspected after 30 minutes of drying at 160° C. In this inspection, the following scale of ratings is used:
1: uniform, fine pores
2: fine to medium pores
3: uniform, medium pores,
4: medium to large pores.

iii: Expansion:

The sound deadener composition with a thickness of 3 mm and an edge length of 60 mm×100 mm is dried at 160° C. for 30 minutes. Afterward, the thickness of the composition is measured again, and the absolute difference in height relative to the thickness prior to drying is ascertained, in mm.

The results are set out in table 1.

TABLE 1

Results of the measurement of loss factor, water absorption, and drying behavior

| Example | Loss factor tan delta max | Water absorption [%] | Blisters | Porosity | Expansion [mm] |
|---|---|---|---|---|---|
| A1 | 0.16 | 11 | 1 | 1-2 | 1.1 |
| A2 *⁾ | 0.16 | 13 | 2 | 2 | 1.3 |
| A3 *⁾ | 0.17 | 12 | 2 | 2-3 | 1.4 |
| A4 *⁾ | 0.16 | 15 | 2 | 2-3 | 1.4 |
| A5 *⁾ | | 15 | 4 | 4 | 4.7 |
| A6 *⁾ | | 18 | 4 | 4 | 4.2 |
| A7 *⁾ | | 12 | 3-4 | 4 | 2.4 |
| A8 *⁾ | | 19 | 3 | 3 | 3.3 |

*⁾ Comparative

The sound deadener composition A1 of the invention, based on dispersion D1 without pigment dispersant, exhibits low water absorption, very good drying behavior, and good damping values. Conversely, the sound deadener composition A2, likewise without addition of pigment dispersant, and based on Acronal® DS 3502 dispersion, exhibits increased water absorption, and poorer drying behavior. The addition of pigment dispersants leads generally to a distinct increase in the water absorption and to impaired drying (examples A3 to A8). As far as the damping characteristics are concerned, compositions A1 to A4 are comparable in their behavior.

The invention claimed is:

1. An aqueous polymer dispersion, comprising at least one polymer obtained by emulsion polymerization of a monomer mixture comprising hydrophilic monomers (a) to (c) having hydrophilic groups;
    (a) at least one (meth)acrylate monomer comprising a polyethylene glycol group;
    (b) at least one acid monomer; and
    (c) at least one hydroxyalkyl(meth)acrylate having 1 to 20 C atoms in the alkyl group,
and also at least one hydrophobic principal monomer (d) selected from:
    (d) an alkyl(meth)acrylate having 1 to 20 C atoms in the alkyl group, a vinylaromatic compound, and a mixture of these monomers,
and also, optionally:
    (e) at least one further monomer, different from the monomers (a) to (d), which is ethylenically unsaturated and radically polymerizable,
    wherein the polymer is obtained by an at least two-stage emulsion polymerization comprising a first polymerization stage with a predominant fraction or an entire amount of the hydrophilic monomers (a) to (c), and a later polymerization stage with a predominant fraction or an entire amount of the hydrophobic monomers (d).

2. The polymer dispersion according to claim 1, wherein the polymer obtained by emulsion polymerization of a monomer mixture comprising
    (a) at least 0.1 wt % of the at least one (meth)acrylate monomer with the polyethylene glycol group;
    (b) at least 0.05 wt % of the at least one acid monomer;
    (c) at least 0.05 wt % of the at least one hydroxyalkyl (meth)acrylate;
    (d) at least 50 wt % of the at least one hydrophobic principal monomer (d);
    (e) 0 to 10 wt % of the further monomer, different from the monomers (a) to (d), which are ethylenically unsaturated and radically polymerizable,
    based in each case on the entire amount of monomers.

3. The polymer dispersion according to claim 1, wherein the polymer is obtained by emulsion polymerization from a monomer mixture comprising
    (a) at least one alkoxy-poly(ethylene glycol) (meth)acrylate;
    (b) at least one selected from the group consisting of acrylic acid and methacrylic acid;
    (c) at least one selected from hydroxyethyl(meth)acrylate, hydroxypropyl(meth)acrylate, and hydroxybutyl(meth) acrylate;
    (d) at least one hydrophobic monomer selected from an alkyl(meth)acrylate having from 1 to 10 C atoms in the alkyl group and styrene;
    (e) optionally at least one further monomer, different from the monomers (a) to (d), which is ethylenically unsaturated and radically polymerizable, selected from the group consisting of a vinyl ester of a carboxylic acid comprising up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds and a mixture thereof.

4. The polymer dispersion according to claim 1, wherein a glass transition temperature of the polymer ranges from −60° C. to less than or equal to +70° C.

5. The polymer dispersion according to claim 1, wherein the first polymerization stage includes more than 50 wt % of the entire amount of the hydrophilic monomers (a) to (c) and at least 1 wt % of the entire amount of the hydrophobic monomers (d), and the later polymerization stage includes at least 80 wt % of the entire amount of the hydrophobic monomers (d).

6. An aqueous particle dispersion, comprising
   (i) the aqueous polymer dispersion of claim 1; and
   (ii) at least one inorganic filler; and
   (iii) optionally at least one organic filler.

7. A sound deadener composition, comprising:
   (a) 5 to 50 wt %, based on solids, of the aqueous polymer dispersion of claim 1;
   (b) 40 to 80 wt % of at least one inorganic filler;
   (c) 0 to 40 wt % of at least one organic filler;
   (d) 10 to 40 wt % of water; and
   (e) 0 to 10 wt % of at least one auxiliary.

8. The sound deadener composition of claim 7, wherein the inorganic fillers are selected from kaolin, chalk, barium sulfate, carbon black, graphite, talc, clay minerals, microdolomite, finely ground quartz, and mica, the organic fillers are selected from powder coating materials, polymer powders of, for example, ground solid ethylene/vinyl acetate copolymer resins, dried acrylate dispersions, and polysaccharides, and the auxiliaries are used at not less than 0.1 wt % and are selected from thickeners, resins, plasticizers, dispersants, cosolvents, stabilizers, wetting agents, preservatives, foam inhibitors, glass beads or plastics beads, hollow glass or plastics bodies, antifreeze agents, antioxidants, UV absorbers, emulsifiers, siloxanes, organically modified siloxanes, and antistats.

9. A process for preparing the aqueous polymer dispersion of claim 1, the process comprising conducting the first polymerization stage with at least the hydrophilic monomers (a) to (c), and conducting the later polymerization stage with at least the hydrophobic monomers (d).

10. A binder adapted for preparing an aqueous particle dispersion,
    wherein:
    the binder comprises the aqueous polymer dispersion of claim 1; and
    the aqueous particle dispersion comprises dispersed inorganic particulate solids that are insoluble in water, and optionally organic particulate solids.

11. The binder of claim 10, wherein the dispersed particulate solids are selected from inorganic fillers, more particularly from kaolin, chalk, barium sulfate, carbon black, graphite, talc, clay minerals, microdolomite, finely ground quartz, and mica.

12. The binder of claim 10, wherein the aqueous particle dispersion is a sound deadener composition or a composition for underbody protection on a motor vehicle.

13. The sound deadener composition of claim 7, which is adapted for vibration damping of bodywork parts of a vehicle.

14. A method for damping oscillations or vibrations of vehicle components, the method comprising applying the sound deadener composition of claim 7 to a vehicle component, and drying the sound deadener composition.

* * * * *